United States Patent [19]

Sato et al.

[11] Patent Number: 5,147,899
[45] Date of Patent: Sep. 15, 1992

[54] PROCESS FOR PRODUCING A FOAMED POLYVINYL ALCOHOL FILM

[75] Inventors: Akihide Sato; Tokio Niikuni, both of Yokkaicho, Japan

[73] Assignee: Mitsubishi Kasei Vinyl Company, Tokyo, Japan

[21] Appl. No.: 745,980

[22] Filed: Aug. 12, 1991

Related U.S. Application Data

[63] Continuation of Ser. No. 393,773, Aug. 15, 1989, abandoned.

[30] Foreign Application Priority Data

Aug. 22, 1988 [JP] Japan .................... 63-207691

[51] Int. Cl.⁵ .................. C08F 16/06; C08J 9/00
[52] U.S. Cl. ........................ 521/141; 521/97
[58] Field of Search .................... 521/141, 97

[56] References Cited

U.S. PATENT DOCUMENTS

| | | | |
|---|---|---|---|
| 2,664,366 | 9/1949 | Wilson | 521/141 |
| 2,876,085 | 3/1959 | Morie | 521/141 |
| 3,141,003 | 7/1964 | Neros | 521/141 |
| 3,481,886 | 12/1969 | Lawes | 521/141 |
| 3,492,250 | 1/1970 | Deyrup | 521/141 |
| 3,591,523 | 7/1971 | Stafford | 524/400 |
| 4,663,358 | 5/1987 | Hyon et al. | 521/141 |

OTHER PUBLICATIONS

Chemical Abstracts, vol. 77, No. 12, abstract no. 76083q, Columbus, Ohio, U.S.; and JP-A-46 035 972.
Database WPI No. 80, abstract No. 67352c, Derwent Publications Ltd., London, GB; and SU-A-713 901.

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

A process for producing a foamed polyvinyl alcohol film, which comprises mechanically foaming an aqueous solution containing a polyvinyl alcohol and a plasticizer, coating the foamed solution on the substrate, followed by heat-drying.

2 Claims, No Drawings

PROCESS FOR PRODUCING A FOAMED POLYVINYL ALCOHOL FILM

This application is a Continuation-In-Part continuation of U.S. patent application Ser. No. 07/393,773, filed on Aug. 15, 1989, now abandoned.

The present invention relates to a process for producing a foamed polyvinyl alcohol film useful as a paste or as an adhesive.

Polyvinyl alcohol melts when heated and as such is useful as a paste in many technical fields. As one of its applications, it is useful as a so-called hot melt adhesive, wherein it is formed into a film, which is interposed between objects to be bonded, followed by heat pressing. As a technique for forming polyvinyl alcohol into a film, a method of extrusion molding by means of a T die, or a method wherein a polyvinyl alcohol is formed into an aqueous solution, which is then coated on a substrate, followed by drying, is commonly known. Such a film is water-soluble and useful for hot melt bonding. By utilizing such characteristics, it is useful also for provisionally bonding woven fabrics and after the stitching, it is washed away with water and removed. If a thick film formed by extrusion molding of polyvinyl alcohol, is used, for instance, for provisional bonding, however, a high temperature is required for the bonding, whereby there will be drawbacks such that the polyvinyl alcohol undergoes a deterioration, and it adheres to the fabrics more than necessary, whereby no adequate bonding is obtainable, and the productivity will be poor since it takes a long time for washing away with water.

According to a method for producing a film by coating an aqueous solution of polyvinyl alcohol on a releasable substrate, it is possible to obtain a film having any desired thickness ranging from a very thin film to a very thick film. However, such a method has drawbacks such that it takes a long time for drying the film, and when peeled off from the substrate and wound up, the film is likely to undergo blocking and is susceptible to rupture, whereby the handling is difficult and it is hardly useful as a paste of a film form.

Under these circumstances, the present inventors have conducted extensive studies for a process for producing a film form paste, which easily adheres and can readily be removed by washing with water. As a result, it has been found that when polyvinyl alcohol is dissolved in water, and the aqueous solution is foamed together with a plasticizer capable of imparting flexibility to the polyvinyl alcohol, followed by casting, a film can be made in any desired thickness and when hot-pressed, provides adequate bonding strength, and when used for provisional bonding, it has a high dissolving rate in water and can readily be removed by washing with water. The present invention has been accomplished on the basis of this discovery.

Namely, it is an object of the present invention to provide a process for producing a foamed polyvinyl alcohol film which is easily soluble in water and which is useful as a hot melt type adhesive.

The present invention provides a process for producing a foamed polyvinyl alcohol film, which comprises mechanically foaming an aqueous solution containing a polyvinyl alcohol and a plasticizer, coating the foamed solution on the substrate, followed by heat-drying.

Now, the present invention will be described in detail with reference to the preferred embodiments.

The polyvinyl alcohol to be used in the process of the present invention is a completely or partially saponified product of a vinyl acetate polymer such as polyvinyl acetate or a copolymer of vinyl acetate with a monomer copolymerizable therewith. Such a saponified product may be used irrespective of the degree of saponification or the degree of polymerization so long as it is water-soluble. When the degree of polymerization is higher than 1,500, the aqueous solution tends to have a high viscosity, whereby stable foams are likely to be formed mechanically as described hereinafter. When the degree of polymerization is not higher than 1,500, foaming of the aqueous solution is easy, and a film obtained from such an aqueous solution tends to have continuous foams. However, since the viscosity is low, foams tend to be unstable, and in some cases, an assisting agent such as a foam stabilizer may be required. In the process of the present invention, it is preferred to employ a polyvinyl alcohol having a polymerization degree of from 300 to 1,800, particularly from 500 to 1,000. The polyvinyl alcohol may, of course, be the one which is commercially available.

There is no particular restriction as to the plasticizer to be used in the process of the present invention, so long as it is soluble in water and compatible with the polyvinyl alcohol and capable of imparting flexibility to the polyvinyl alcohol. The plasticizer includes, for example, glycols such as glycerol, ethylene glycol, diethylene glycol, triethylene glycol, dipropylene glycol and polyethylene glycol; water-soluble esters such as methyl acetate and ethyl acetate; and alcohols such as methanol, ethanol and isopropyl alcohol. These materials may be used alone or in combination as a mixture of two or more.

The amount of the plasticizer varies depending upon the type of the polyvinyl alcohol and the type of the plasticizer. Usually, however, the plasticizer is required to be in a amount capable of providing flexibility to the polyvinyl alcohol and is preferably in an amount of from 5 to 80 parts by weight, more preferably from 10 to 40 parts by weight, relative to 100 parts by weight of the polyvinyl alcohol. If the plasticizer is less than 5 parts by weight, it tends to be difficult to impart sufficient flexibility to the film, whereby there will be troubles such that the film will have cracks when wound up, and it peels off from a releasing paper. On the other hand, if the amount exceeds 80 parts by weight, the plasticizer tends to bleed out on the film surface, thus leading to blocking after being wound up.

For the preparation of an aqueous solution containing the polyvinyl alcohol and the plasticizer, there may be employed, for example, a method wherein the polyvinyl alcohol is dispersed in water or in warm water and heated under stirring, and when it has completely dissolved, a proper amount of the plasticizer is added thereto, or a method wherein the polyvinyl alcohol and the plasticizer are simultaneously put into water or into warm water, followed by stirring under heating. They can readily be dissolved by heating at a temperature of at least 90° C. However, depending upon the type of the polyvinyl alcohol, it may happen that the time required for dissolution tends to be prolonged at a high temperature, and in such a case, it is desired to continue the stirring in water without heating. The concentration of the aqueous solution is preferably at a solid content within a range of from 20 to 65% by weight, more preferably from 45 to 55% by weight. If the solid concentration is outside this range, the aqueous solution tends to have a low viscosity or a high viscosity, whereby foaming tends to be difficult, and uniform coating onto the substrate tends to be difficult after foaming. The aqueous solution thus prepared is then foamed mechanically by a foaming machine or by a stirrer. The foaming may be conducted by blowing air by an air blower. A proper amount of a foam-stabilizer may be added for foaming. An important thing here is to obtain an uniform and stable foamed state.

The foam content of the aqueous solution is suitably selected depending upon the desired thickness and the density of the polyvinyl alcohol film, usually the solution is foamed in such manner that the foaming ratio is at least 2, preferably in the range of from 2 to 5.

$$\text{Foaming ratio} = \frac{\text{Volume of foamed solution}}{\text{Volume of solution before foamed}}$$

When the foaming ratio is within this range, the film usually has continuous foams. However, the film obtained by the process of the present invention is useful even when the foaming ratio is less than two.

The foamed aqueous solution of the polyvinyl alcohol is then coated on a substrate by various coating methods and dried by evaporation of water in an oven at a temperature of from 60° to 150° C. to obtain a film. The dried film is usually cooled to a temperature of about room temperature and then wound up together with the substrate or after the substrate was removed. The thickness of the film is usually not higher than 1,000 μm, preferably from 100 to 500 μm. In the process of the present invention, a roll coating method, a gravier coating method, a reverse coating method or a knife coating method may suitably be employed. Further, as the substrate, paper, woven fabric, thin metal plates or heat resistant resin may for example be employed. Such a substrate may have a releasing agent coated thereon.

According to the process of the present invention, the aqueous solution containing the polyvinyl alcohol and the plasticizer can be foamed to an optional foaming ratio and then can be coated on a substrate in an optional thickness, whereby it is possible to produce a film having a desired thickness, ranging from a thin film to a thick film.

The foamed polyvinyl alcohol film obtained by the process of the present invention is free from blocking and easy to handle, and when it is used as a hot melt adhesive, air can readily be withdrawn to provide excellent adhesiveness. Further, when it is used for provisional bonding, even if the film thickness is substantial, the amount of the polyvinyl alcohol to be removed by washing with water is actually small, and thus it provides excellent operation efficiency.

Now, the present invention will be described in further detail with reference to Examples. However, it should be understood that the present invention is by no means restricted to such specific Examples.

EXAMPLES 1 TO 3

300 g of polyvinyl alcohol (Poval 505, polymerization degree: about 500, manufactured by Kurare K.K.) was introduced a Hobert bowl and after an addition of 500 g of warm water at 40° C., stirred and dissolved. To this solution, 30 g of polyethylene glycol (PEG 600, Nippon Soda K.K.) was added as a plasticizer, and the mixture was stirred by a foaming machine for a predetermined time for foaming. The foamed solution was coated in a predetermined thickness on a releasing paper (Sepak CBS, manufactured by Ojikako K.K.) by a knife coater and then dried for five minutes in a drier at 150° C., and then wound up by a center winder.

The stirring time, the foaming ratio, the thickness of coating, the thickness of the film after drying and the dissolving time of the film in each Example were shown in the following Table 1.

COMPARATIVE EXAMPLE

An aqueous solution having the same polyvinyl alcohol and plasticizer as used in Examples dissolved without foaming, was formed into a film in the same manner as in the Examples. The results are also shown in Table 1.

TABLE 1

|  | Example | | | Comparative example |
| --- | --- | --- | --- | --- |
|  | 1 | 2 | 3 |  |
| Stirring time (min) | 30 | 60 | 30 | 30 |
| Foaming ratio | 2.5 | 4.5 | 2.5 | — |
| Coating thickness (μm) | 500 | 500 | 50 | 50 |
| Film thickness (μm) | 500 | 500 | 50 | 20 |
| Dissolving time (sec) | 10 | 6 | 5 | Not dissolved |

Method for measuring the dissolving time:

The film was cut into a square with each side being 10 cm, and 10 cc of water was applied thereto by a dropping pipet, and the time until water penetrated to the rear side of the film and the polyvinyl alcohol resin at the spot where the water was applied, was completely dissolved, was measured.

We claim:

1. A mechanically foamed polyvinyl alcohol film which is easily soluble in water at a temperature of 40° C., consisting essentially of a polyvinyl alcohol and a plasticizer in an amount of from 5 to 80 parts by weight per 100 parts in weight of polyvinyl alcohol, wherein the foaming ratio of the foamed film is in the range of from 2 to 5.

2. The film according to claim 1, wherein said film is an adhesive applied to a substrate.

* * * * *